United States Patent [19]
Grant

[11] Patent Number: 5,500,643
[45] Date of Patent: Mar. 19, 1996

[54] ONE-HAND PREHENSILE KEYBOARD

[76] Inventor: Alan H. Grant, 3208 Woodhollow Dr., Chevy Chase, Md. 20815

[21] Appl. No.: 112,195

[22] Filed: Aug. 26, 1993

[51] Int. Cl.$^6$ ........................................................ B41J 5/10
[52] U.S. Cl. ............................... 341/22; 341/23; 345/168; 400/486; 400/489
[58] Field of Search .................... 341/22, 20, 23; 345/165, 157, 158, 168, 212; 200/86.5; 400/489, 485, 486; 364/709.11–709.15

[56] References Cited

U.S. PATENT DOCUMENTS

| | | | |
|---|---|---|---|
| D. 316,541 | 4/1991 | Roberts | D14/100 |
| D. 317,595 | 6/1991 | Yoshitake | D14/100 |
| D. 318,287 | 7/1991 | Tsukamoto | D18/7 |
| D. 323,817 | 2/1992 | Buchin | D14/100 |
| D. 324,513 | 3/1992 | Sakaguchi et al. | D14/100 |
| 3,698,532 | 10/1972 | Dodds | 197/100 |
| 4,042,777 | 8/1977 | Bequaert et al. | 179/79 |
| 4,180,337 | 12/1979 | Otey, III et al. | 400/486 |
| 4,483,634 | 11/1984 | Frey et al. | 400/489 |
| 4,695,983 | 9/1987 | Oda et al. | 364/709 |
| 4,823,294 | 4/1989 | Rouhani | 364/709.12 |
| 4,891,777 | 1/1990 | Lapeyre | 364/706 |
| 4,974,183 | 11/1990 | Miller | 364/709 |
| 5,059,048 | 10/1991 | Sirkin | 400/486 |
| 5,119,078 | 6/1992 | Grant | 340/711 |
| 5,129,747 | 7/1992 | Hutchison | 400/489 |
| 5,156,475 | 10/1992 | Zilberman | 400/472 |
| 5,288,158 | 2/1994 | Matias | 400/472 |
| 5,336,002 | 8/1994 | Russo | 400/489 |

FOREIGN PATENT DOCUMENTS

| | | | |
|---|---|---|---|
| 972465 | 10/1959 | Germany | 400/486 |
| 465535 | 2/1950 | Italy | 400/486 |

Primary Examiner—James J. Groody
Assistant Examiner—Glenton B. Burgess
Attorney, Agent, or Firm—Jacobson, Price, Holman & Stern

[57] ABSTRACT

A one hand, QWERTY keyboard angles the rows of keys away from the top and bottom parallel axes of the keyboard so as to eliminate ulnar-deviation of the actuating hand. This permits the orientation of the device to be parallel to the frontal plane of the body. Further, by positioning one or more keys on a front vertical surface of the keyboard, the thumb can actuate these keys in a natural-grasping, prehensile movement towards the fingers. The keyboard operates in two basic function modes. In a first mode, textual letters and symbols are input and in a second mode, numbers or symbols as for mathematical or scientific calculation are input. Once the user has turned on the device, the user can either press the "L" portion of a switch for letter usage or the "N" portion of the switch for number usage.

12 Claims, 2 Drawing Sheets

ONE-HAND PREHENSILE KEYBOARD

FIELD OF THE INVENTION

This invention relates to a one-hand prehensile keyboard operable in a letter or a numeric mode.

BACKGROUND OF THE INVENTION

Known hand-held computing devices, designed to be operated by one hand, suffer several shortcomings. One of the shortcomings is that the individual keys are usually small and difficult to access, even with an anatomically small hand. Further, the control keys are numerous and the use of these devices is difficult to learn.

In addition, usually, the devices are of a flat rectangular shape with the rows of keys extending parallel to the top and bottom edges of the external shape. The legends on the keys are also printed in a vertical orientation with respect to the top and bottom edges of the device. If the user of the device holds the device in their left hand and positions the device so the top and bottom axes are parallel to a frontal plane of the body, then the right hand, to access the keys of the device, has to be ulnar-deviated outwardly to have the fingers effectively access the keys.

Alternately, if the user chooses to posture the device at an angle that would eliminate the ulnar-deviation of the hand, then the visual appearance to the users eye is skewed away from a primary reading position. The key legends and the screen are thereby stressfully oriented away from both the horizontal and vertical planes.

Further, these known devices typically make no provision for the thumb to be actively involved in accessing the keys. Since all the keys are in the same plane, the thumb would have to access these keys in a non-prehensile manner. This is awkward and contrary to a prehensile mode wherein the anatomically opposable thumb moves naturally towards the fingers.

SUMMARY OF THE INVENTION

By the present invention, a one hand, QWERTY keyboard angles the rows of keys away from the top and bottom parallel axes of the keyboard so as to eliminate ulnar-deviation of the actuating hand. This permits the orientation of the device to be parallel to the frontal plane of the body. Further, by positioning one or more keys on a front vertical surface of the keyboard, the thumb can actuate these keys in a natural-grasping, prehensile movement towards the fingers.

The present invention allows a hand-held computing device to operate in two basic function modes. In a first mode, textual letters and symbols are input and in a second mode, numbers or symbols as a means of mathematical or scientific calculation are input. Therefore, once the user has turned on the device, the user can either press the "L" portion of a switch for letter usage or the "N" portion of the switch for number usage.

If in the L-mode, then the thumb actuated keys on a side surface of the keyboard are programmed to perform the functions of space, backspace, and enter. The surface keys retain their traditional QWERTY layout functionality.

If operating in the N-mode, then the thumb-actuated keys are programmed to perform the ±, X, ÷ functions. The N-mode also transforms the functionality of the following keys into a traditional calculator arrangement as follows: 1, 2, 3, 4 become the calculator equivalent of 7,8,9,MC Q,W,E,R become the calculator equivalent of 4,5,6,MR
A,S,D,F become the calculator equivalent of 1,2,3,M–
Z,X,C,V become the calculator equivalent of 0,.,=,M+
Of course, other variations for performing calculator control key functions are possible.

For purposes of clarity, each of the keys which are shiftable between the L-mode and N-mode, include two legends on the surface of the key and a contrasting color background for the surface of the key. A border of a contrasting color around the geographic area of the keys which operate between the N-mode and the L-mode also helps to visually identify the affected keys.

If either the L-mode or N-mode is activated, the user can press a "Title" key. A string of letters/numbers can be input to title a particular file. When the "Title" key is actuated a second time, the title appears in the top left screen position of a display screen, and a cursor advances to the next line. The device is now ready to accept text or numbers as the contents of that titled file.

When a titled-file is to be saved, the "Save" button is pressed once. When depressed a second time, the screen is cleared for new activity.

To recapture a previously-saved file, the Recall or "Rec" button is actuated. This causes a list of all previously saved files, in descending order, starting with the first saved file to be shown. A cursor underlines the first saved file. If the "Rec" button is depressed again, the cursor moves downward to underline the next saved file.

To review the saved file highlighted, then the review or "Rev" button is actuated. The file desired to be reviewed then appears on the screen.

For a quick escape from any saved file or unsaved data on the screen, the Escape or "Esc" key is depressed twice and a clear screen appears.

To delete a saved file, the Delete or "Del" key is tapped three times. A shift key and/or a capital-lock key can be incorporated into the device, but may not be necessary. In the absence of these keys, the text will automatically be entered in capital form.

By the present invention, a prehensile keyboard/calculator is created with a unique interchangeable L-mode and N-mode functionality. The keyboard includes 40 finger-actuated letter and number keys, three thumb-actuated L-mode control keys, three thumb-actuated N-mode control keys and five finger-actuated control pods on the primary surface.

It is contemplated as being within the scope of the invention that a device usable with a right-handed user would be produced and a separate device would be produced for a left-handed user, being a mirror image of the right-handed keyboard.

It is an object of the present invention to provide a one-hand, hand held keyboard, operated by a hand in a prehensile position.

It is another object of the present invention to provide a hand held prehensile keyboard shiftable between letter input use and numeric input use.

It is another object of the present invention to provide a hand held prehensile keyboard operable in combination with a printer, a computer and/or a modem.

These and other objects of the invention, as well as many of the intended advantages thereof, will be come more readily apparent when reference is made to the following description taken in conjunction with the accompanying drawings.

DETAILED DESCRIPTION OF THE PREFERRED EMBODIMENTS

Figure 1:
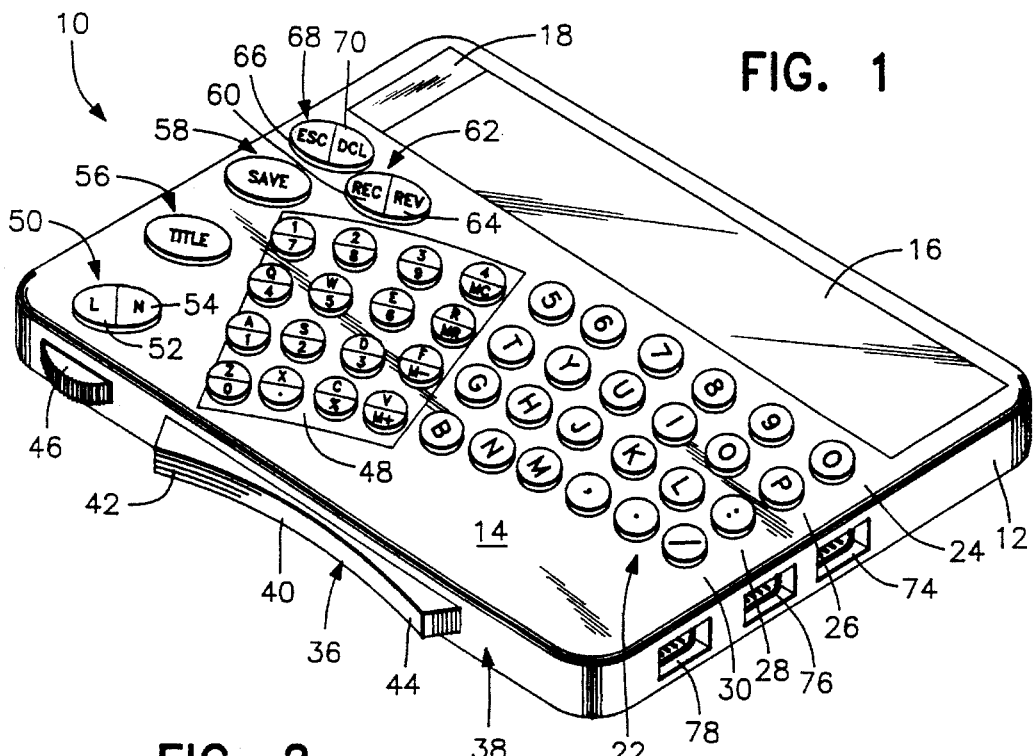
FIG. 1 is a perspective view of a one-hand prehensile keyboard.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
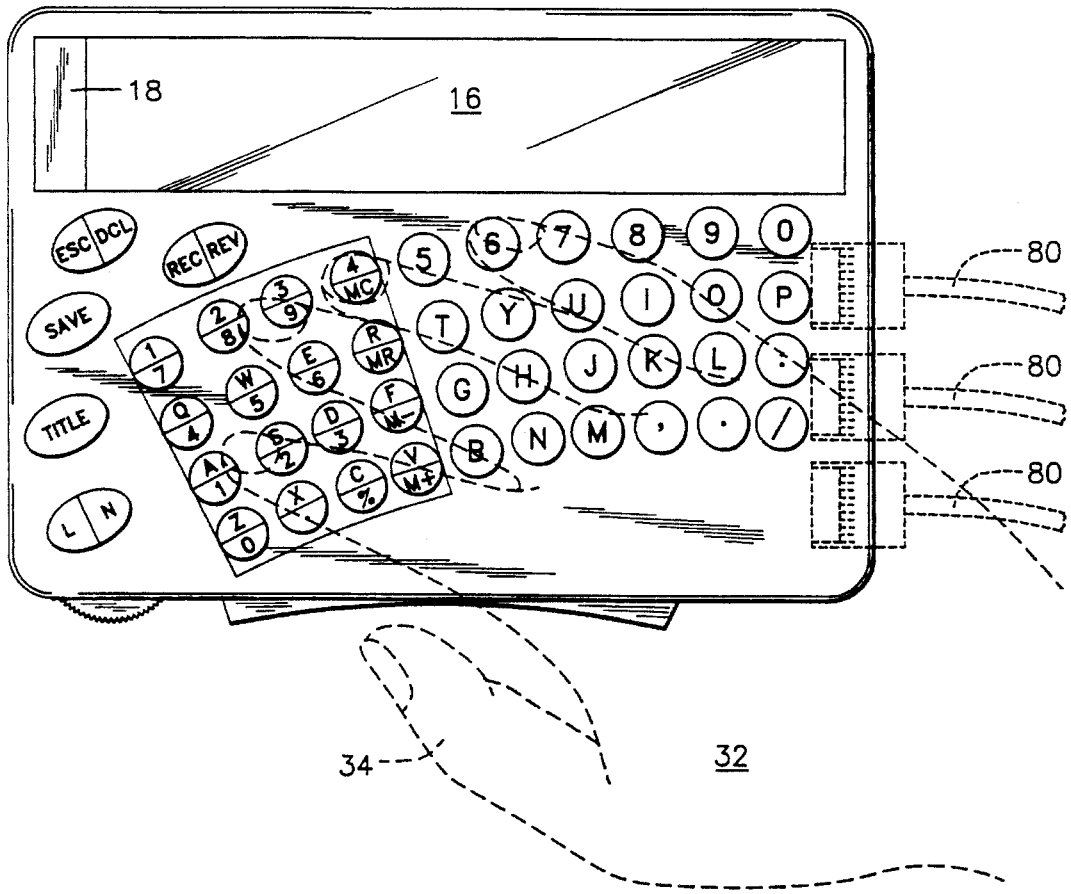
FIG. 2 is a top plan view of the one-hand prehensile keyboard.
Figure 3:
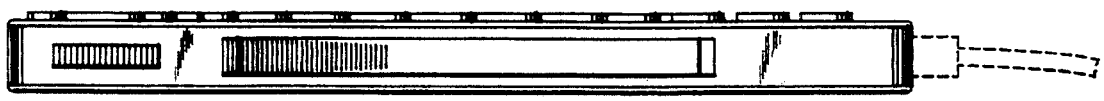
FIG. 3 is a front side view of the one-hand prehensile keyboard.
Figure 4:
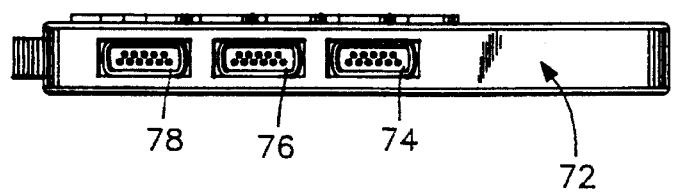
FIG. 4 is a right side view of the one-hand prehensile keyboard.

With reference to the drawings, in general, and FIGS. 1 and 2, in particular, a one-handed prehensile keyboard embodying the teachings of the subject invention is generally designated as 10. With reference to its orientation in FIG. 1, the one-hand prehensile keyboard includes a housing 12 having an upper flat surface 14.

Figure 5:
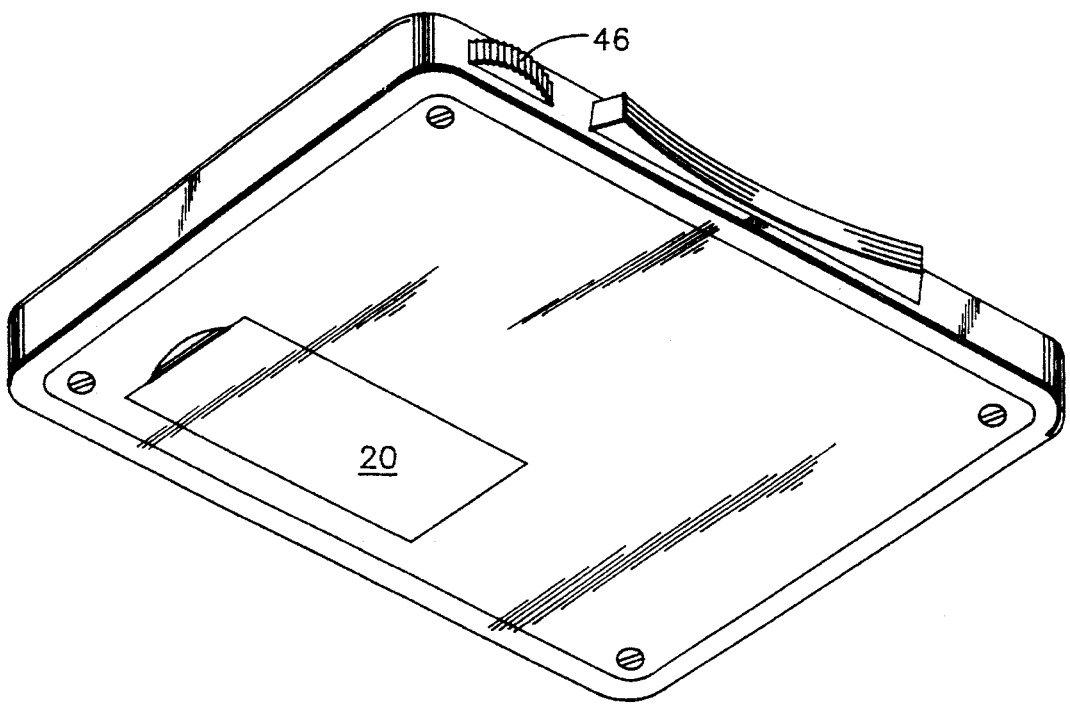
FIG. 5 is a bottom perspective view of the one-hand prehensile keyboard.

At an upper edge of the surface 14 is a display screen 16 measuring approximately 1"×5" so as to accommodate a 40 character string per line with 8 lines of data being displayed on the display screen. To the left of the display screen 16 is solar panel 18 for powering the keyboard 10 in combination with a battery source located behind battery door 20 as shown in FIG. 5.

The overall size of housing 12 is approximately 4" wide by 5¾" long with a thickness of approximately ½". On the upper surface 14 are a plurality of keys forming a QWERTY keyboard. Each of the keys is approximately ⅜" in diameter. They are arranged in a standard QWERTY format with the respective rows 24, 26, 28, and 30, diverging across upper surface 14 of the keyboard from the right edge towards the left edge in an arc of approximately 10° to 20°.

The legend(s) on the keys shift in angular position according to the shifting of the rows of keys. Therefore, when the keyboard is operated by a hand in a prehensile position the keys will be easily readable.

The positioning of the keys on upper surface 14 is such that the hand 32 of an operator, as shown in phantom lines in FIG. 2, when grasping the keyboard 10, with a thumb 34 of the operator aligned adjacent to a switch 36, located on a front side surface 38 of the keyboard 10, locates the hand and arm of the operator in a straight hand-wrist posture to avoid outward ulnar-deviation. The keyboard is aligned with the side surface 38 extending such that the thumb 34, when engaging switch 36, is located in a prehensile position with respect to the fingers of the hand resting on the keys for depression of any desired key pattern.

Switch 36 is pivotable about its approximate mid-point 40 so that ends 42 and 44 are rockable about a central pivot point 40 for actuation of opposed switches depressed by inward depression of end 42 or end 44 towards the keyboard body. Depression of the switch 36 at the approximate mid-point 40 will actuate a third switch for operation of three distinct functions by the switch 36.

On/off thumb wheel switch 46 also projects from front side surface 38.

The keys 22 within bordered section 48 have a dual function depending upon which side of L/N switch 50 is depressed. If the L side 52 is depressed, all the keys 22 including those keys within bordered section 48 operate as letters (or as their upper labeled half for those dual labeled keys contained within bordered section 48).

If N side 54 of switch 50 is depressed, then only the keys within bordered section 48 are active and perform the function of the legend of their lower labeled half, for performing calculator functions.

In addition to the L/N switch 50, depression of switch 56 allows entry of a title for a new file. A second depression of switch 56 causes a cursor to move to a second line for entry of data.

The titled document is saved by depressing save switch 58. A second depression of switch 58 clears the screen for entry of new information.

Depression of the recall portion 60 of switch 62 lists previously saved files. Each depression of recall portion 60 highlights a successively named file.

To review a highlighted file, review button portion 64 is depressed. To escape from any saved file or unsaved data on the screen, the escape switch portion 66 of switch 68 is depressed two times and a clear screen appears. To delete a saved file, the delete button portion of switch 68 is depressed three times.

In addition to the key entry function of keys 22, depressing end 42 of switch 36 causes entry of a space in the displayed text on display screen 16, depression of the central portion 40 of switch 36 causes a back space functioning and depression of end 44 of switch 36 causes an "enter" function to be accomplished.

In addition to the functions of the prehensile keyboard 10, additional devices may be coupled to the keyboard through the ports shown on the right hand side 72 of the keyboard. Printer port 74, computer port 76 and auxiliary/modem port 78 allow interconnection with additional remote devices. The storage capacity and static ROM of the keyboard 10 is selectable for loading and recalling information as is commonly known and to interact with remote devices. The keyboard includes the necessary information to be compliant with the printer, computer and/or modem connected by cables 80 as is shown in dotted lines in FIG. 2.

Having described the invention, many modifications thereto will become apparent to those skilled in the art to which is pertains without deviation from the spirit of the invention as defined by the scope of the appended claims.

I claim:

1. A keyboard for use by one hand of an operator, said keyboard comprising:

a housing including an upper surface, two side surfaces, a top surface and bottom surface, display means on said upper surface of said housing for display of indicia, a plurality of keys located on said upper surface in a QWERTY keyboard pattern with rows of said keys arranged in an arc initiating from one of said two side surfaces and terminating adjacent to the other of said two side surfaces and said bottom surface for actuation by the fingers on one hand of an operator, some of said plurality of keys including a letter of the alphabet and numeric indicia, means for switching actuation of said some of said plurality of keys between causing a letter of the alphabet display on said display means in a first mode and numeric display on said display means in a second mode, and a switch located on said bottom surface for actuation by a thumb of the operator in a prehensile position when the fingers of the operator are located on said plurality of keys, said switch performing different functions dependant upon the mode selected by said means for switching.

2. The keyboard of claim 1, wherein said side surface is perpendicular to said upper surface.

3. The keyboard of claim 1, wherein said display means is on said upper surface.

4. The keyboard of claim 1, wherein said plurality of keys are in four rows.

5. The keyboard of claim 1, wherein said switch on said side surface controls three different functions.

6. The keyboard of claim 1, wherein said rows are aligned transverse to a top and bottom edge of said housing.

7. The keyboard of claim 1, wherein a plurality of control keys are positioned on said upper surface.

8. A keyboard for use by one hand of an operator, said keyboard comprising:

a housing including an upper surface, two side surfaces, a top surface and bottom surface, said upper surface of said housing including rows of keys arranged in a QWERTY pattern with rows of said keys arranged in an arc initiating from one of said two side surfaces and terminating adjacent to the other of said two side surfaces and said bottom surface with some of said keys including both numeric and letter legends for producing a numeric display upon actuation in a first mode and for producing a letter display upon actuation in a second mode, and a display for displaying numeric and letter indicia produced by actuation of said keys, means for switching between said first mode and said second mode, and a switch positioned on said bottom surface of said housing for engagement by a thumb of an operator when the operator's fingers engage said keys so that the fingers and thumb of the operator are in a prehensile position and the hand and wrist of the operator are positioned so as to eliminate ulnar deviation of the actuating hand, said switch performing different functions dependent upon the mode of operation of said keys.

9. The keyboard of claim 8, wherein there are four rows of keys.

10. The keyboard of claim 8, wherein said some keys are arranged in a calculator pattern.

11. The keyboard of claim 8, wherein said rows of keys are arranged transverse to said bottom surface of said housing.

12. The keyboard of claim 8, wherein a plurality of control keys are positioned on said upper surface.

* * * * *